O. H. JONES.
Belt-Fastener.

No. 216,092.  Patented June 3, 1879.

Witnesses:
Richard Collins
William H. Martin

Inventor
Owen H. Jones
By Allen Webster
his atty.

UNITED STATES PATENT OFFICE.

OWEN H. JONES, OF HARTFORD, CONNECTICUT.

IMPROVEMENT IN BELT-FASTENERS.

Specification forming part of Letters Patent No. 216,092, dated June 3, 1879; application filed February 26, 1879.

*To all whom it may concern:*

Be it known that I, OWEN H. JONES, of Hartford, in the county of Hartford and State of Connecticut, have invented new and useful Improvements in Belt-Fasteners, of which the following is a specification.

This invention relates to devices for connecting the ends of machine-belting.

The object of my invention is to make a belt-fastener of one piece of metal, with which the ends of the belting may be readily connected, and in such a manner that the strain will be uniform, and the application of which will not necessitate the removal of any appreciable amount of stock from the belting. The same fastener may be used a great number of times on belting of varying thickness, and with which the place of bearing in the belting of any one of the arms or hooks may be changed without changing the position of the entire fastener; also one with which, in its application, several lines of bearing may be had.

The invention consists in making the fastener of one thin flexible piece of metal, with a number of integral arms bent to pass through the belting at varying distances from the center-piece. Said arms may be either of varying or equal lengths.

Figure 1:
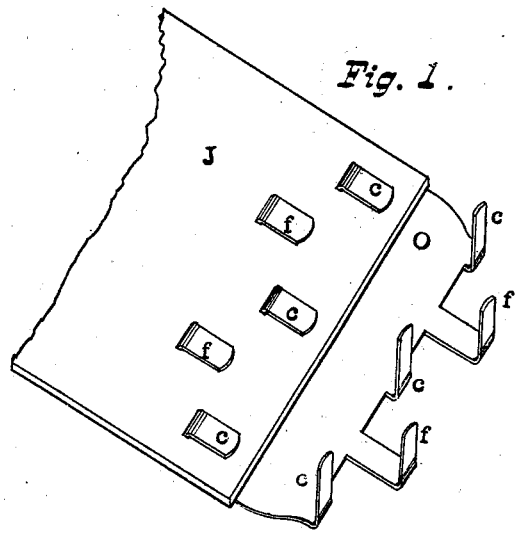
Figure 2:
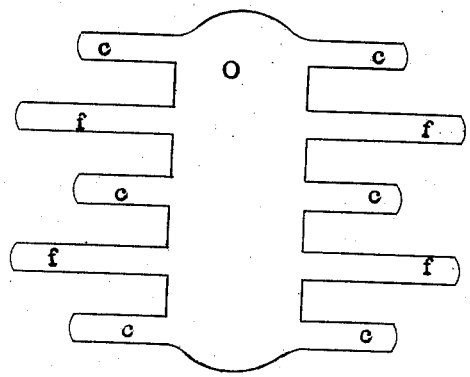
Figure 3:
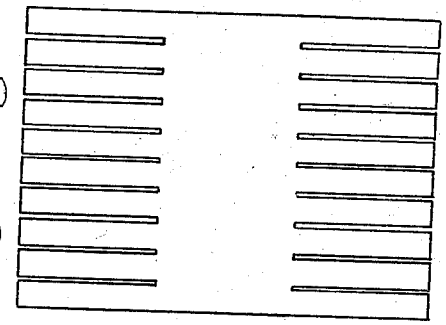

In the accompanying drawings, in which similar letters of reference indicate like parts, Figure 1 is a perspective view of my device, showing one side or set of hooks inserted in a piece of belting, with the other side or set of hooks bent preparatory for use. Fig. 2 is a view of my device as it appears before the arms are bent; and Fig. 3 is a view of one in which the arms are of equal length and more numerous than in Figs. 1 and 2.

The fastener is made of one piece of metal, brass being preferable, though any kind of metal may be used which will bear the strain and allow of the requisite amount of bending. For ordinary three-inch belting I use brass of about one-sixteenth of an inch in thickness, though it will be seen that the thickness required depends largely on the heft of the belting to which they are to be applied and the strain to which it is to be subjected. I stamp or cut it in the shape shown in Fig. 2, and each alternate arm is longer than the one next to it. This I do for the purpose of obtaining a bearing in the belting in more than one line, the object being to obtain a number of points of bearing without weakening the belt to any appreciable extent, as would be the case were all the punctures in the same line. It will be seen that the same result will be accomplished if I make the arms of equal length and bend them at varying distances from their ends, or from the center plate, o, though in this case, when bent down on the opposite side of the belt, the arms or hooks will appear to be of unequal lengths.

In the drawings, Fig. 1 represents my device with one side or set of hooks inserted in the piece of belting J, with the arms bent down or clinched, showing the other side of the fastener with the arms or hooks bent ready for insertion in the belting.

To insert the hooks, I first press the belting against the ends of the hooks, thus marking the places where the holes are to be made in the belting. In this way accuracy is obtained and the strain will be uniform on all the bearings; and the place of the bearing of any one or more of the hooks or arms may be changed without changing the position of any other bearing or part of the fastener.

It will be seen that the width of the fastener must depend upon the width of the belt, though several small fasteners may be used on one wide belt. The better way, however, is to use one fastener of a sufficient width.

It will also be seen that the distance between the arms is not material; and if a greater amount of bearing-surface is desired in the belting, then the arms or hooks may be located very near together, as shown in Fig. 3, and several lines of holes made in the belting. I do not therefore confine myself to this particular construction, though I deem it the best.

Having therefore described my invention, what I claim as new, and desire to secure by Letters Patent, is—

1. An improved belt-fastener consisting of a flexible metal plate, o, provided with attaching arms or hooks c, of different lengths, and bent at varying distances from the edge of the plate, substantially as shown and described.

2. An improved belt-fastener consisting of a flexible metal plate, o, having attaching arms or hooks of equal length, bent at varying distances from the edge of the plate, so as to form two or more lines of bearing when attached to the belt, substantially as set forth.

In testimony whereof I have hereunto set my hand in the presence of two witnesses.

OWEN H. JONES.

Witnesses:
ALLEN WEBSTER,
WILBUR B. STOWE.